Figure 1:
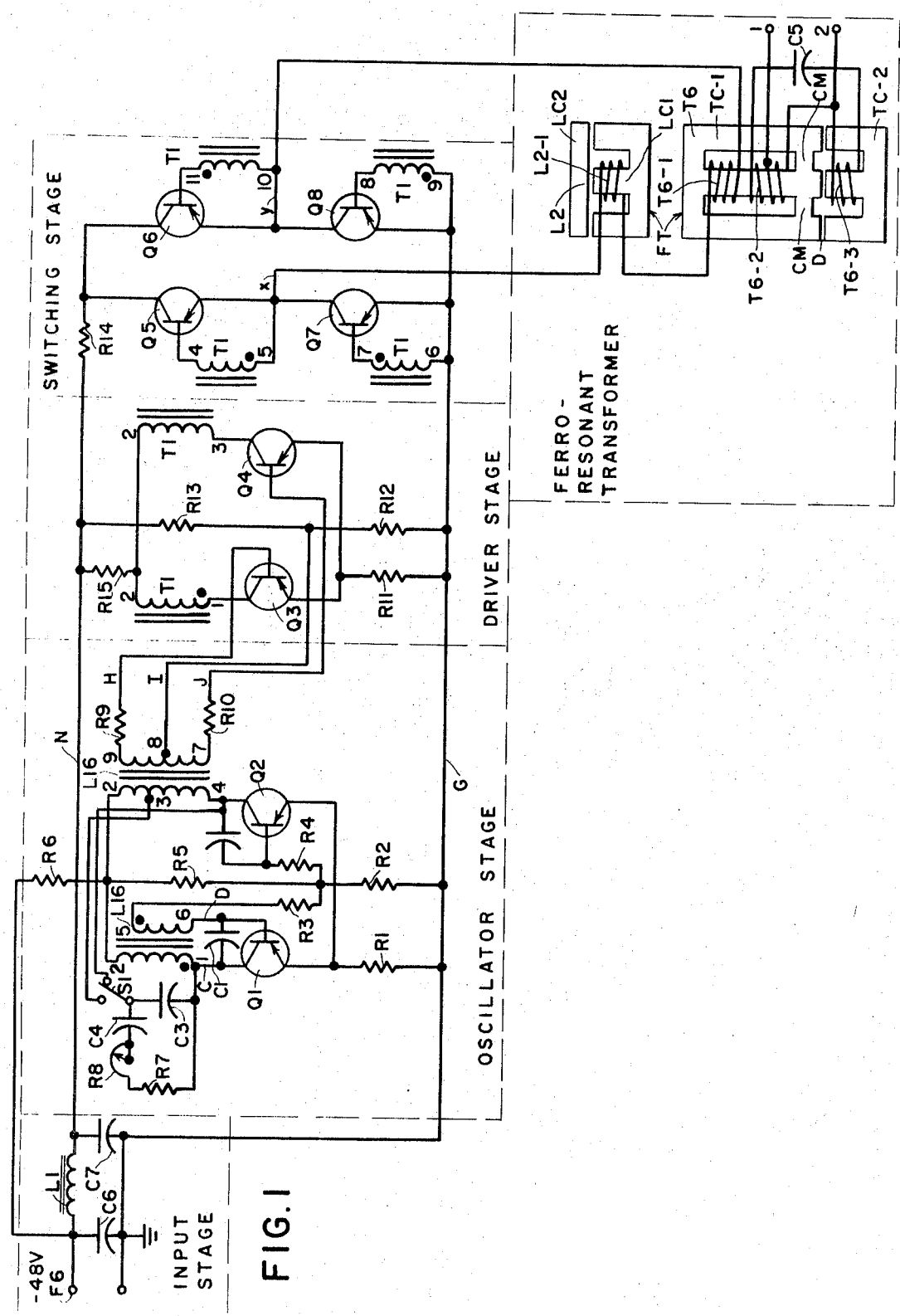

Sept. 12, 1967  E. C. RHYNE, JR  3,341,766
CHOKED FERRORESONANT TRANSFORMER SYSTEM
Filed June 18, 1963  2 Sheets-Sheet 1

Sept. 12, 1967  E. C. RHYNE, JR  3,341,766
CHOKED FERRORESONANT TRANSFORMER SYSTEM
Filed June 18, 1963  2 Sheets-Sheet 2

United States Patent Office 3,341,766
Patented Sept. 12, 1967

3,341,766
CHOKED FERRORESONANT TRANSFORMER SYSTEM
Earl C. Rhyne, Jr., Millis, Mass., assignor to The Warren Manufacturing Company, a division of The Dielectric Products Engineering Company, Inc., Littleton, Mass., a corporation of Michigan
Filed June 18, 1963, Ser. No. 288,764
9 Claims. (Cl. 321—9)

This invention relates to electric inverters for generating from direct-voltage power sources, alternating-voltage power of predetermined frequencies to be used for example as stand-by power sources or as ringing generators in telephone communication equipment. The invention relates particularly to switching inverters having a sinusoidal output voltage.

The invention further relates to an improved transformer which is particularly useful in switching inverters for producing sine-wave output voltages. Switching inverters are conventionally employed in telephone-ringing generators to translate the direct input voltage to alternating voltage, which by means of a power transformer is transferred to the ringing devices. However the resulting square-wave output voltage may be undesirable.

It is an object of my invention to provide an inverter which produces an essentially sinusoidal output voltage, or whose output voltage possesses the desirable characteristics of a sine wave, namely a voltage waveform whose upper harmonics are substantially suppressed.

It is another object of the invention to provide a static-state sine-wave ringing generator capable of producing an output voltage of fixed frequency and reliably fixed amplitude. Another object is to provide an inverter whose elements are protected from adverse conditions while in use.

Another object of this invention is to provide a transformer particularly suitable for operation with switching inverters for achieving a sine-wave output.

It is a further object of the invention to provide a voltage transforming and regulating apparatus of a general type having a substantially harmonic-free output voltage.

Yet another object of the invention is to provide an improved transformer system having an output voltage which is substantially constant irrespective of variations of input voltage while being substantially sinusoidal over the complete range from no load to full load, and which may be assembled from readily available parts.

According to another feature of the invention, in a transformer circuit, I couple tightly a primary and secondary winding upon core means and provide a capacitor which when connected to the secondary winding tunes the transformer to resonance at a particular frequency. I then connect the secondary winding into a circuit with an auxiliary winding which is coupled to link with a portion of the flux of the secondary winding, and connect in series with the primary winding a choke. As another feature of the invention I provide the auxiliary winding of the transformer upon a second core which is interlinked only with the flux of the secondary winding by a gap.

As yet another feature of the invention, I utilize either of these transformers in the inverter described above.

Figure 3:
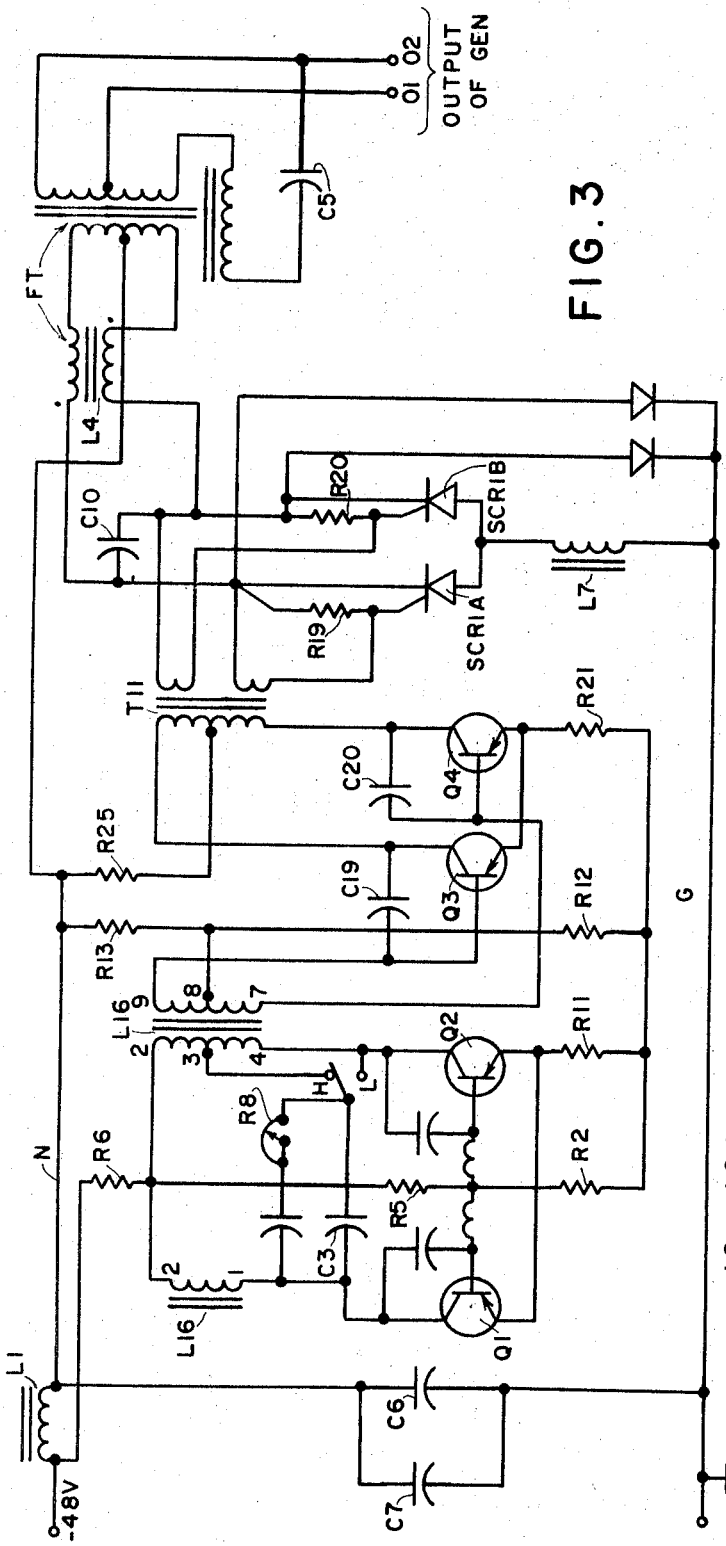
Figure 2:
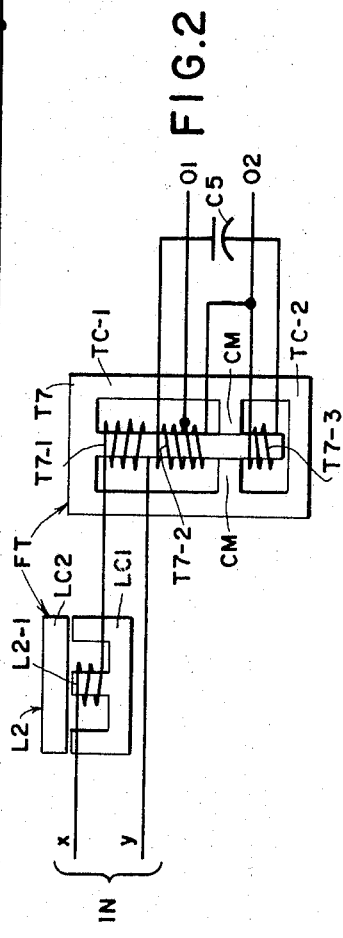

The various features of novelty characterizing the invention are pointed out in the claims forming a part of this specification. For a more complete understanding of the invention, reference may be had to the following description wherein embodiments of the invention are described in detail, and to the accompanying drawings in which:

FIGS. 1 and 3 are schematic circuit diagrams of an inverter embodying features of the invention; and
FIG. 2 is a schematic circuit diagram of a ferromagnetic transformer suitable for use in the circuit of FIG. 1.

In the following description, correlated numerical examples of electric parameter values are given, but it should be understood that these values are presented only by way of example and may be modified in proper correlation to one another, depending upon the requirements or preferences of any particular application. With reference to these values, all resistance may be rated for approximately .5 watt with the exception of resistor R8 and resistor R14 which may be rated for 2 watts and 5 watts respectively. The transistors Q1 to Q8 of the illustrated generator consist preferably of junction-type transistors such as p-n-p germanium transistors.

FIG. 1 shows an inverter used as a ringing generator although it will be understood that the invention is not limited thereto. The ringing generator is divided into five sections namely an input stage, an oscillator stage, a driver stage, a switching stage, and a ferro-resonant transformer. In the input section a pair of terminals F6 and GND (ground) connect to the negative and positive terminals of a 48-volt direct current source such as a battery. A filter reactor L1, connected in series with the terminal F6, and a pair of filter capacitors C6 and C7 provide audio frequency isolation so that the noise of the ringing generator does not appear at the battery terminals, the battery being used also to furnish talking currents in the telephone system.

The oscillator stage comprises a pair of 2N241A transistors Q1 and Q2 whose emitters connect respectively through a 4.7K resistor R1 to a grounded bus G. The collectors of transistors Q1 and Q2 receive energy from the negative terminal F6 by way of a 3.9K resistor R6 through respective winding halves 1, 2 and 2, 3, 4 of a primary winding 1, 4 on a transformer L16. A voltage divider, composed of a 2.7K resistor R2 and a 2.7K series resistor R5 and connected between the resistor R6 and the bus G, establishes biasing potentials at the bases of transistors Q1 and Q2 with the aid of two 33K resistors R3 and R4 connecting respectively from the tap of the voltage divider to the bases of transistors Q1 and Q2.

Connected between the resistor R3 and the base of transistor Q1 is the secondary winding 5, 6 of the transformer L16. This furnishes opposite signal voltages at the base of transistors Q1, Q2. The windings in transformer L16 are wound for positive feedback, as shown by the dots positioned according to A.I.E.E. standards, so that an increase in current through the transistor Q1 which may prevail at any one time is reinforced.

Two 0.1 microfarad capacitors C3 and C4 form a parallel resonant tank circuit with the primary winding of transformer L16. A switch S1 serves to switch between taps 3 and 4 upon the winding 2, 4 for setting the frequency range of the tank circuit to the desired ringing frequency. Two 10K resistors R7 and R8 serve to adjust the frequency within the range.

Oscillations are sustained by the energy feedback to the base circuits of transistors Q1 and Q2 from the respective collectors through transformer L16. At each instant the prevailing change in current is sustained by the feedback connection and is reversed at intervals depending upon the tuning of the tank circuit. Upon each reversal the ON transistor of Q1 and Q2 is turned off and the OFF transistor is turned on. During each half cycle the feedback connection again sustains the prevailing change in current.

Another secondary winding 7, 8, 9 on transformer L16 connects the oscillator stage to the driver stage by means of lines H, I and J connecting respectively to the end terminal 9, the midtap 8 and the end terminal 7 of the secondary winding. Two 220-ohm resistors R9 and R10 are connected respectively in the lines H and J.

The driver stage is essentially a parallel inverter comprised of transistors Q3 and Q4 whose bases connect respectively to the lines H and J. The line I connects to the midtap of a voltage divider comprised of 10K resistors R12 and R13, thereby establishing the direct-current biasing potentials at the bases of transistors Q3 and Q4. A common 1.0K emitter resistor R11 connects the emitters of transistors Q3 and Q4 respectively to the positive bus G. The collectors of transistors Q3 and Q4 connect respectively to the end terminals 1 and 3 of a primary winding 1, 3 on a transformer T1, which primary winding possesses a center tap 2. A 470-ohm resistor R15 connects the center tap 2 of the winding 1, 3 to a negative lead N which connects to the negative terminal F6 by way of the choke L1. During one half cycle the oscillator stage applies a negative potential to the base of transistor Q3 and a positive potential to the base of transistor Q4. This turns on a transistor Q3 and turns off transistor Q4 so as to cause current flow through winding half 1, 2. During the opposite half cycle of oscillation the transistor Q3 is turned off and transistor Q4 is turned on so as to cause current flow through winding half 2, 3. The split winding 1, 3 of transformer T1 preserves the symmetry of the output signal.

The transformer T1 possesses upon its core four secondary windings designated 4, 5 and 6, 7 and 8, 9 and 10, 11 for the purpose of actuating the switching stage. The changing currents in the separate halves of winding 1, 3 induce into the secondary windings control voltages for operating the switching stage. This stage is comprised of four power transistors Q5, Q6, Q7 and Q8 and a 330-ohm resistor R14 supplying negative potential from the negative lead N to the collectors of transistors Q5 and Q6. At respective points X, Y, the collectors of transistors Q7 and Q8 connect respectively to the emitters of transistors Q5, Q6, the emitters of transistors Q7 and Q8 connecting to ground bus G. The ferro-resonant transformer system FT represents a load impedance between points X, Y.

The secondary windings 4, 5 and 6, 7 and 8, 9 and 10, 11 connect between the respective emitters and bases of transistors Q5, Q7, Q8, Q6 and possess the winding directions shown by the dots. During any half cycle the emitter-base circuits of transistors Q5, Q8 receive like switching currents and the emitter base circuits of transistors Q6 and Q7 receive like switching currents. That is to say, when current flows in transistor Q3 through the winding 1, 2 the emitters of transistors Q5 and Q8 are simultaneously made more positive than their respective bases, thereby turning on transistors Q5 and Q8. At the same time, the windings 6, 7 and 10, 11 render the emitters of transistors Q7 and Q6 more negative than their respective bases, thereby turning off transistors Q7 and Q6. On the opposite half cycle, transistors Q6 and Q7 will be turned on whereas transistors Q5 and Q8 will be turned off. The voltages applied to the respective inputs of transistors Q5 to Q8 are sufficient to turn the respective transistors completely on or off, depending on the applied polarity, within the first few degrees of each half cycle.

Connecting the junctions X, Y between the series-connected transistors Q5, Q7 and Q6, Q8 is the primary input circuit of a ferroresonant transformer system FT. Included in this input circuit is a choke L2 in series with the primary winding T6–1 of the transformer portion T6. During the half cycle when transistors Q5 and Q8 are on, current will pass from the negative lead N to the resistor R14, through the transistor Q5, through a choke L2, a winding T6–1 of transformer T6 forming part of system FT, the transistor Q8 to bus G. In the opposite half cycle, current will flow from the resistor R14 through transistor Q6 through the transformer winding T6–1, choke L2, transistor Q7 again to bus G. This alternating current through choke L2 and the transformer primary T6–1 induces a voltage in a ferroresonant transformer secondary T6–2 of the transformer T6. Connected in series with the secondary T6–2 is an auxiliary winding T6–3 which, with the secondary winding, is connected in parallel with a tuning capacitor C5. The value of the capacitor C5 is such as to effect resonance of the transformer T6 with the frequency at which the primary T6–1 is being excited, namely the oscillator frequency. Two output terminals 1 and 2 are connected across a portion of the secondary winding T6–2. The output voltage of such a ferroresonant transformer corresponds in frequency to the oscillator frequency but possesses a sinusoidal waveform and a constant amplitude.

The choke L2 is comprised of two laminated core members LC1 and LC2 having respective E and L shapes, and a winding L2–1 upon the center leg of the E-shaped core. The cores LC1 and LC2 are separated by a gap, the width of which is determined by a non-magnetic insert (not shown).

The transformer portion of the ferroresonant transformer system FT and supporting the windings T6–1, T6–2 and T6–3 is designated T6. It comprises laminated core members TC–1 and TC–2 made of suitable material such as for example transformer "c" steel. Two cross members designated CM in the core member TC–1 possess a reduced cross section compared to the center, outer, upper and lower legs of both core sections. The core member TC–2 is E shaped and positioned to face the corresponding legs of the core portion TC–1. A non-magnetic strip of predetermined thickness separates the two core sections to form a gap D at the three areas of engagement between the core sections.

Mounted upon the center leg of the core portion TC–1 in tightly coupled relation are the two transformer windings T6–1 and T6–2. The transformer auxiliary winding T6–3 is mounted on the center leg of core portion TC–2 and connected in series with the secondary winding T6–2. The capacitor C5 is connected across the secondary winding and auxiliary winding, and the output is taken across a portion of the secondary winding T6–2 at the output terminals 1 and 2.

The following dimensions are applicable to the transformer according to the preferred embodiment of the invention, although it will be understood that the transformer may be otherwise embodied and may have other dimensions according to the requirement of a particular design.

The transformer core T6, and particularly its portion TC–1, is assembled from 20 laminations each .018 inch thick and having outer dimensions of 3 inches by 5¾ inches. Two 2¾ inches by ½ inch windows were removed from side by side locations upon the laminations to leave three vertical legs having respective widths of ½, 1 and ½ inch. The windows were each stamped out ½ inch from the top and the portions CM were reduced in cross section either before or after assembly to a dimension of 5⁄16 inch. The core portion TC–2 was assembled from 20 .018-inch laminations having ½ by 1½-inch recesses cut therein to form an E shape so that the horizontal longer leg member has a width of ½ inch.

A square wave input produces in the ferroresonant transformer system an output voltage having a fixed sinusoidal frequency of fixed amplitude and sinusoidal waveform. Virtually all harmonics are removed from this output voltage so that the adverse effect of harmonic voltages upon the telephone ringing equipment are virtually eliminated.

The operation of the device according to FIG. 1 is as follows:

The voltage applied between the terminals F6 and GND sustain oscillations within the oscillator circuit composed of transistors Q1 and Q2 at a frequency determined by the tank circuit L16, C3, C4. The transformer winding 7, 8, 9 applies the oscillator output to the bases of transistors Q3, Q4 in phase-opposed relation so that these transistors are alternately turned on and off. Thus when transistor Q3 is turned on, transistor Q4 is turned off. The thus-excited tapped collector winding 1, 2, 3 applies to the magnetically-coupled secondary windings 4, 5; 6, 7; 8, 9; 10, 11 respective voltages which during one-half cycle turn on transistors Q5 and Q8 and while turning off transistors Q6 and Q7. On the opposite half cycle transistors Q6 and Q7 are turned on while transistors Q5 and Q8 are turned off.

This switching of opposite alternate transistors in the final stage furnishes, during one-half cycle, current flow through the resistor R14 to the emitter-collector, or main, current path of transistor Q5 through the choke L2 and primary winding T6–1, through the main current path of transistor Q8, and to ground line G. In the opposite half cycle, current flows from resistor R14 through transistor Q6, primary winding T6–1, choke L2, transistor Q7, and to ground line G.

The voltages applied by the transformer T1 are such as to cause transistors Q5 through Q8 to conduct fully, i.e. saturate, or to turn off fully, within the first few degrees of each half cycle. This produces in the choke L2 and transformer primary T6–1 a virtual square wave which is essentially symmetrical due to the double-ended feed to the transistors Q3 and Q4 by the windings 7, 8, 9 of transformer L16. The ferroresonant transformer FT furnishes a constant sinusoidal output voltage at the terminals 1 and 2 for a constant frequency input.

The ferroresonant transformer FT need not be constructed as shown. In particular, the transformer core T6 need not be comprised of two separate cores but may be comprised of a single core having the structure shown in FIG. 2 wherein the choke L2 and the upper portion of the transformer T7 correspond to the choke L2 and upper part of transformer T6 in FIG. 1. In FIG. 2, however, the core portion TC–2 connects with the core portion TC–1 and a gap is provided between the center leg and the iron along the lower edge of the core.

The ferroresonant transformer of FIG. 2 has primary, secondary and auxiliary windings and forms a resonant circuit with capacitor C5. It serves to furnish a sinusoidal output voltage of constant amplitude for a constant frequency square wave input. The transformers of FIGS. 1 and 2 are tightly coupled.

A short circuit across the output terminals 1 and 2 will not adversely affect the supply at terminals F6 and GND because of the peculiar properties of the ferroresonant transformer.

Thus, according to the invention, the circuit provides a generator for telephone-ringing equipment which produces an essentially sinusoidal output voltage which prevents over-heating of the ringing devices in a telephone system. The amplitude and frequency of the device according to the invention is reliably fixed and the ringing generator elements are protected from adverse conditions while in use by the isolating effect of the ferroresonant transformer.

It should be noted that any audio frequency signals are contained within the generator system by the filters C6, C7, and L1 which prevent these signals from passing to the source at terminals F6 and GND.

The invention also provides in FIGS. 1 and 2 an improved transformer system having an output voltage which is substantially constant irrespective of variations of input voltage while being substantially sinusoidal over a complete range from no-load to full-load.

The invention also contemplates an inverter connected to transformer FT having a switching stage with silicon controlled rectifiers as shown by the circuit diagram of FIG. 4, wherein the rectifiers SCR1A and SCR1B form a parallel inverter connected to the transformer FT. This transformer corresponds to FT of FIG. 1. It possesses a portion T9 having a center-tapped primary winding and a choke L4 having two windings on a common core. The winding directions of the choke L4 are as shown by the dots. The effect of choke L4 corresponds to that of choke L2 in FIG. 1.

It will be obvious to those skilled in the art that the invention may be embodied otherwise without departing from the present invention and within the scope of the following claims.

I claim:

1. In an electric inverter including a pair of direct voltage input leads, a source of alternating voltage and switching means responsive to said source of alternating voltage and connected to said input leads for producing a substantially square-wave output voltage, a ferroresonant transformer comprising primary winding means, secondary winding means and auxiliary winding means, core means for said winding means forming a gap between said auxiliary and said other two winding means, said core means including a first core member, said primary and secondary winding means being wound on said first core member in the same magnetic path, capacitor means connected to said secondary and auxiliary winding means, said capacitor means and said secondary winding means resonating at the frequency of the square-wave output voltage of said switching means, and output means connected to said secondary winding means, said core means including a second core member for said auxiliary winding means, said first and second core members being spaced from each other to form said gap and being inductively interlinked, and choke means magnetically separate from said ferroresonant transformer and outside the flux path of said ferroresonant transformer, said choke means being connected between said switching means and said primary winding means.

2. A ferroresonant transformer system comprising primary winding means, secondary winding means, auxiliary winding means, core means for said winding means, said core means forming a gap between said secondary winding means and said auxiliary winding means, said core means including a core leg, said primary and secondary winding means being wound on said core leg in the same magnetic path, capacitor means connecting said auxiliary winding means and secondary winding means in a resonant circuit, output means connected to said secondary winding means, choke means magnetically separate from said ferroresonant transformer and outside the flux path of said ferroresonant transformer, said choke means being connected to said primary winding means, and input means connected to said choke means.

3. A ferroresonant transformed system comprising primary winding means, secondary winding means, auxiliary winding means, core means for said winding means, said core means comprising a single core member forming a gap between said secondary winding means and said auxiliary winding means, said core means including a core leg, said primary and secondary winding means being wound on said core leg in the same magnetic path, capacitor means connecting said auxiliary winding means and secondary winding means in a resonant circuit, output means connected to said secondary winding means, choke means magnetically separate from said ferroresonant transformer and outside the flux path of said ferroresonant transformer, said choke means being connected to said primary winding means, and input means connected to said choke means.

4. A ferroresonant transformer system comprising primary windings means, secondary winding means, auxiliary winding means, core means for said winding means, said core means forming a gap between said secondary winding means and said auxiliary winding means, said core means including a first core member for said auxiliary winding means and a second core member, said primary and secondary winding means being wound on said second core member in the same magnetic path, capacitor means connecting said auxiliary winding means and secondary winding means in a resonant circuit, output means connected to said secondary winding means, choke means magnetically separate from said ferroresonant transformer and outside the flux path of said ferroresonant transformer, said choke means being connected to said primary winding means, and input means connected to said choke means.

5. In an electric inverter as claimed in claim 1, wherein said core means comprises a single core member.

6. In an electric inverter as claimed in claim 1, wherein said choke means and said primary winding means are connected in series circuit arrangement in shunt with said switching means.

7. A ferroresonant transformer system as claimed in claim 2, wherein said choke means comprises ancillary core means spaced from said core means and inductive reactance means wound on said ancillary core means in series circuit arrangement with said primary winding means.

8. A ferroresonant transformer system as claimed in claim 7, wherein said ancillary core means comprises a core of substantially E configuration having a trunk and three substantially equally spaced legs extending substantially perpendicularly from said trunk in substantially parallel relation to each other, and said inductive reactance means is wound on one of said legs intermediate the other two of said legs.

9. A ferroresonant transformer system as claimed in claim 8, wherein said ancillary core means further comprises a bar core of substantially bar configuration positioned adjacent said legs at their ends opposite said trunk, said bar core being substantially parallel to said trunk and being spaced from said legs.

References Cited

UNITED STATES PATENTS

| | | | |
|---|---|---|---|
| 2,444,715 | 7/1948 | Walker | 323—61 |
| 2,694,177 | 11/1954 | Sola | 323—60 |
| 2,944,163 | 7/1960 | Walsh | 323—61 |
| 3,041,551 | 6/1962 | Dornhoefer. | |
| 3,061,769 | 10/1962 | Smyth | 323—60 X |
| 3,112,440 | 11/1963 | Moyer | 323—56 |
| 3,247,449 | 4/1966 | Medlar | 323—48 |

JOHN F. COUCH, *Primary Examiner.*

W. M. SHOOP, *Assistant Examiner.*